United States Patent [19]
Neumann

[11] Patent Number: 5,917,560
[45] Date of Patent: Jun. 29, 1999

[54] LOW COST COLOR CUBE FOR LIQUID CRYSTAL LIGHT VALVE PROJECTOR

[75] Inventor: Margarete Neumann, Penetanguishene, Canada

[73] Assignee: Raytheon Company, Lexington, Mass.

[21] Appl. No.: 08/563,501

[22] Filed: Nov. 28, 1995

[51] Int. Cl.[6] .................................................. G02F 1/1335
[52] U.S. Cl. ............................................................ 349/8
[58] Field of Search .................................. 349/5, 6, 7, 8, 349/62; 359/636, 640, 632, 638, 639, 629

[56] References Cited

FOREIGN PATENT DOCUMENTS

| 6-43419 | 2/1994 | Japan | 349/8 |
| 6-118367 | 3/1994 | Japan | 349/5 |

*Primary Examiner*—William L. Sikes
*Assistant Examiner*—James A. Dudek
*Attorney, Agent, or Firm*—W. C. Schubert; G. H. Lenzen, Jr.

[57] ABSTRACT

A liquid crystal projector and color beamsplitter that comprises a single X-cube beamsplitter that transmits both incident and exit light beams. One half of the beamsplitter divides incident white light into three primary colors, and the other half of the beamsplitter combines the primary colors to produce white light that is used for projection. More specifically, the projector comprises a light source for projecting white light, and the color beamsplitter is disposed to receive the white light. The beamsplitter comprises four (right angle) prisms that each comprise a base and two sides, and that are disposed such that the sides of the prisms are adjacent each other. The incident white light is separated by the prisms and coupled along three separate light paths corresponding to red, green and blue light paths. Apparatus such as a plurality of mirrors, or an optical link, for example, are provided for coupling the red, green and blue light back toward the beamsplitter. The red, green and blue light returned toward the beamsplitter is combined by the beamsplitter to produce white light that is transmitted as projected light.

10 Claims, 2 Drawing Sheets

LOW COST COLOR CUBE FOR LIQUID CRYSTAL LIGHT VALVE PROJECTOR

BACKGROUND

The present invention relates generally to liquid crystal light valve projectors, and more particularly, an improved color beamsplitter cube and liquid crystal light valve projector employing the color beamsplitter cube.

The assignee of the present invention designs and develops liquid crystal light valve projectors. As part of this effort, a stacked X-cube color beamsplitter has been developed for use in certain of the liquid crystal light valve projectors. Stacked X-cube color beamsplitters are generally discussed in a publication by Technology J. A. Fowler and R. Blanchard in 912.SID92 Digest, in a paper entitled "Avionics Display using LCD Projection".

The stacked X-cube color beamsplitter employs eight prisms that are arranged in two stacked groups of four prisms each that separately process incident white light to divide the incident white light into three primary colors, and combine the divided primary colors to produce white light that is projected. More specifically, the stacked X-cube color beamsplitter requires eight right angle prisms that are cemented to two cubes of four prisms each.

This stacked X-cube color beamsplitter is relatively costly to produce because of the relatively large number of optical elements that are used therein. Furthermore, a considerable amount of time is required to cement the prisms together to fabricate the cube. The amount of mounting hardware that is needed to assemble the prisms into the cube is also greater than is desired.

Accordingly, it is an objective of the present invention to provide for an improved color beamsplitter cube and liquid crystal light valve projector employing the color beamsplitter cube.

SUMMARY OF THE INVENTION

To meet the above and other objectives, the present invention comprises a liquid crystal projector and color beamsplitter that comprises a single X-cube beamsplitter that transmits both incident and exit light beams. One half of the X-cube beamsplitter divides incident white light into three primary colors, and the other half of the X-cube beamsplitter combines the primary colors to produce white light that is used for projection. The present invention reduces the number of prisms needed to split and recombine the primary colors (red-green-blue) from eight prisms in the prior design to only four prisms.

More specifically, the liquid crystal projector comprises a light source for projecting white light, and the color beamsplitter is disposed to receive the white light. The beamsplitter comprises four (right angle) prisms that each comprise a base and two sides, and that are disposed such that the sides of the prisms are adjacent each other. The incident white light is separated by the prisms and coupled along three separate light paths corresponding to red, green and blue light paths. Means, such as a plurality of mirrors, or an optical link, for example, are provided for coupling the red, green and blue light back toward the beamsplitter. The red, green and blue light returned toward the beamsplitter is combined by the beamsplitter to produce white light that is transmitted as projected light.

The single X-cube beamsplitter of the present invention provides for a more compact and mechanically stable optical configuration. Fewer prisms are required in the design and are handled during optical production. A larger prism size greatly improves angular accuracy during grinding, polishing and cementing. Fewer optical elements are handled during coating processes. Considerably less time is required to cement the prisms of the cube together, and less mounting hardware is required.

The present invention may be used with liquid crystal light valve projectors that employ color beamsplitter cubes (X-cubes), which are normally used in commercial applications. The present invention reduces the overall costs of with liquid crystal light valve projectors in which it is used.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
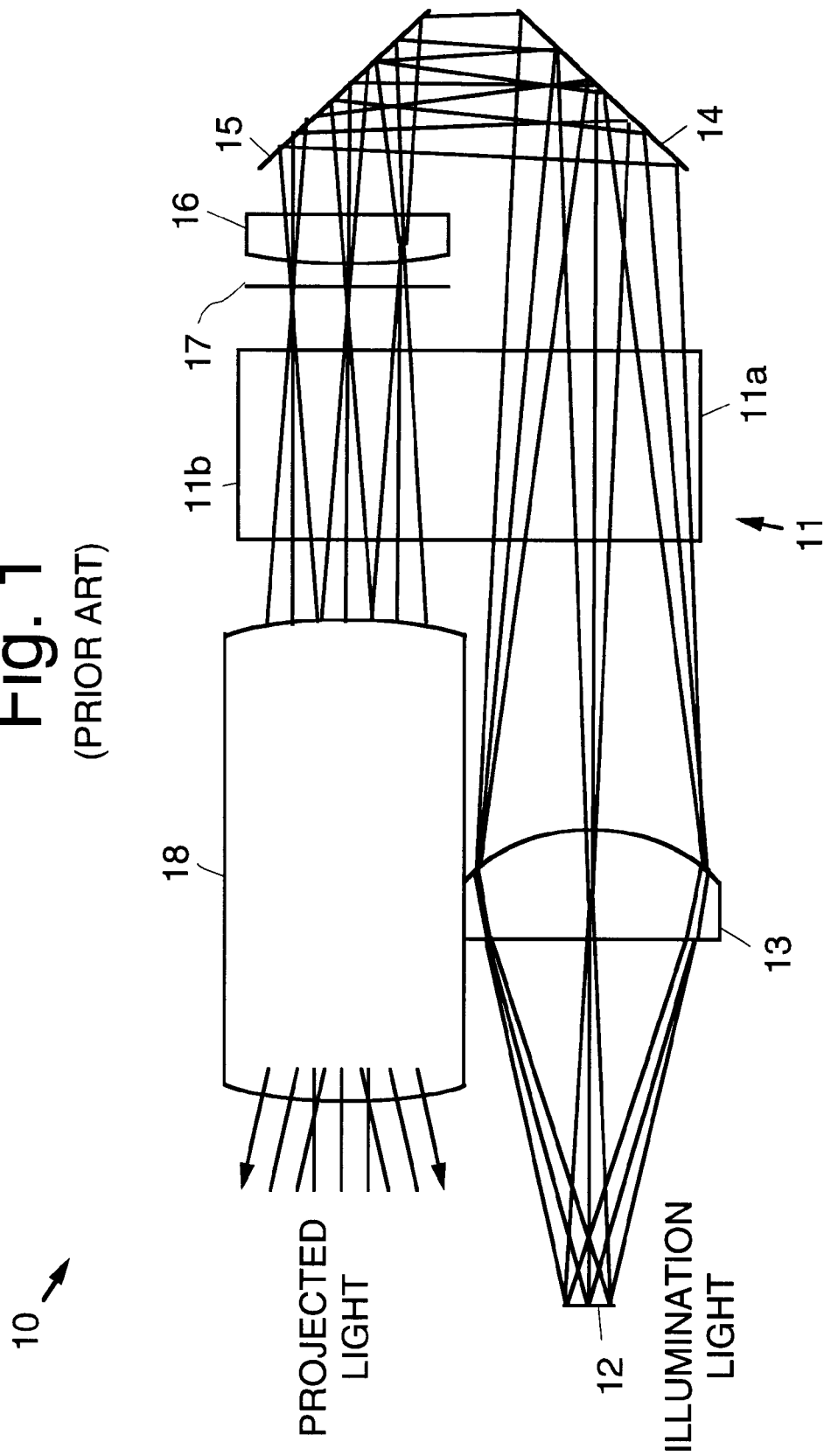
FIG. 1 illustrates a liquid crystal light valve projector employing a conventional stacked X-cube color beamsplitter.

Referring to the drawing figures, FIG. 1 illustrates a liquid crystal light valve projector 10 employing a conventional stacked X-cube color beamsplitter 11. The stacked X-cube color beamsplitter 11 comprises eight prisms (not shown) that are arranged in two stacked groups 11a, 11b of four prisms each. The stacked X-cube color beamsplitter 11 requires eight right angle prisms that are cemented to two cubes of four prisms each.

The first group of prisms 11a processes incident white light derived from a light source 12 and imaged by an input lens 13 and divides the incident white light into three primary colors. The divided light is reflected by way of two mirrors 14, 15 and imaged by an intermediate lens 16 through an aperture stop 17 through the second group of prisms 11b. The second group of prisms 11b combines the divided primary colors to produce white light that is projected by means of an output lens 18.

Figure 2:
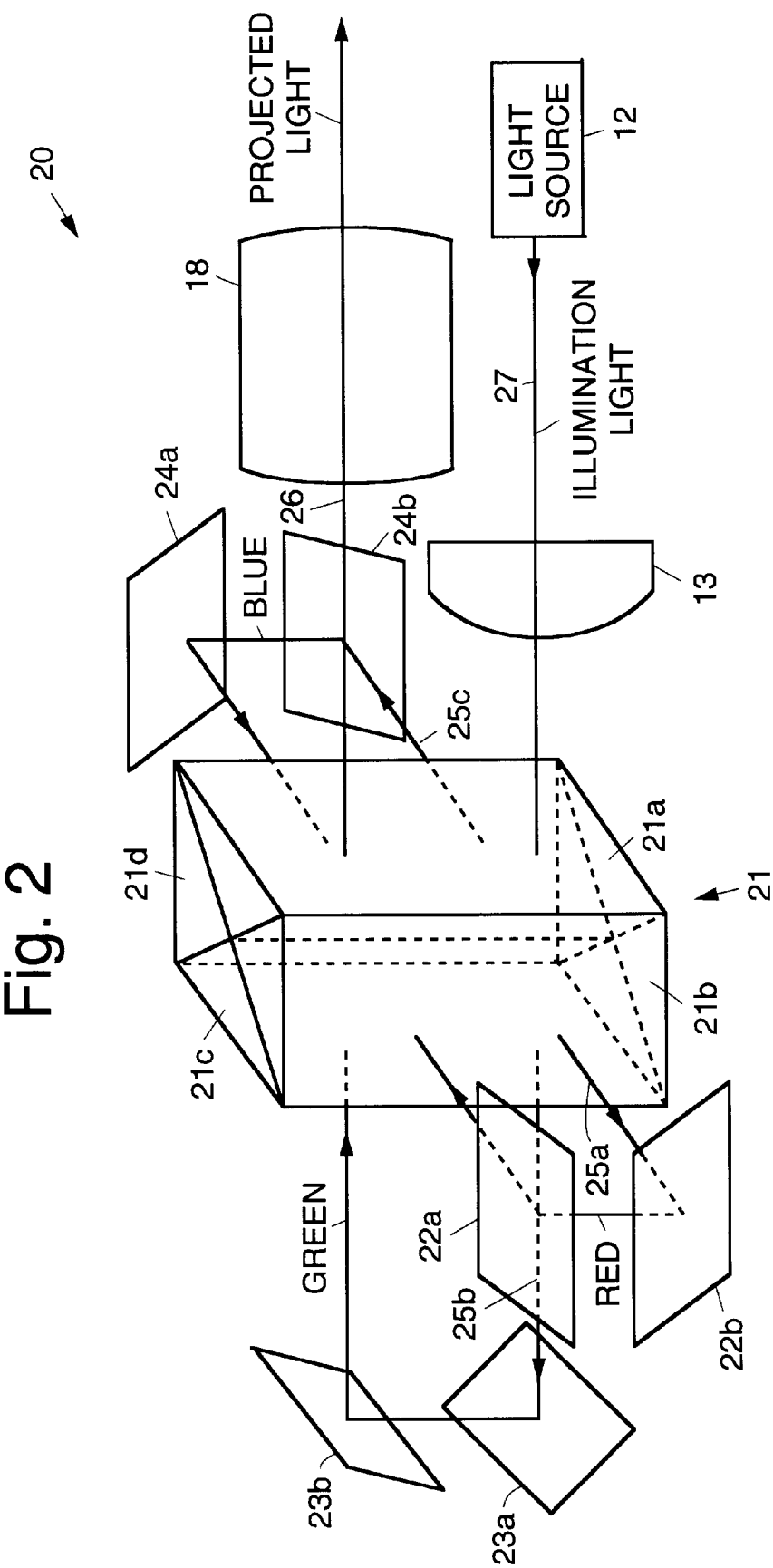
FIG. 2 illustrates a liquid crystal light valve projector employing a X-cube color beamsplitter in accordance with the principles of the present invention.

Referring now to FIG. 2, it illustrates a liquid crystal light valve projector 20 employing an X-cube color beamsplitter 21 in accordance with the principles of the present invention. The liquid crystal light valve projector 20 comprises a light source 12 that projects white light along an input path 27 through an input lens 13 that focuses the white light onto the X-cube color beamsplitter 21. The X-cube color beamsplitter 21 comprises four prisms 21a, 21b, 21c, 21d that in a preferred embodiment comprise right angle prisms 21a, 21b, 21c, 21d, that each have a base and two sides. The prisms 21a, 21b, 21c, 21d are bonded or cemented together such that the sides of the prisms 21a, 21b, 21c, 21d are adjacent each other. Optical coatings are applied to each of the adjacent bonded surfaces of the prisms 21a, 21b, 21c, 21d so that the incident white light is separated and coupled along three separate light paths 25a, 25b, 25c corresponding to red, green and blue light paths 25a, 25b, 25c.

Red light transmitted along the red light path 25a is reflected from two mirrors 22a, 22b (or an optical link, for example) and returned through the beamsplitter 21 and reflected along an output path 27. Green light transmitted along the green light path 25b is reflected from two mirrors 23a, 23b and returned through the beamsplitter 21 and reflected along the output path 27. Similarly, blue light transmitted along the blue light path 25c is reflected from two mirrors 24a, 24b and returned through the beamsplitter 21 and reflected along the output path 27. The red, green and blue light reflected from the respective mirrors 22a, 22b, 23a, 23b, 24a, 24b is combined by the beamsplitter 21 to produce white light transmitted along the output path 26 as projected light. The projected light is imaged by an output lens 18 disposed along the output path 26 for display.

Thus, in the present invention, one half of the X-cube beamsplitter 21 divides incident white light into the three primary colors, and the other half of the X-cube beamsplitter 21 combines the primary colors to produce white light for projection. The present invention thus reduces the number of prisms 21a, 21b, 21c, 21d needed to split and recombine the primary colors from eight prisms in the prior design to four in the present design.

The single X-cube beamsplitter 21 of the present invention thus provides for a more compact and mechanically stable optical configuration. Fewer prisms 21a, 21b, 21c, 21d are required and handled during optical production. Each of the prisms 21a, 21b, 21c, 21d are larger in size than the conventional design which greatly improves angular accuracy during grinding, polishing and cementing. Fewer prisms 21a, 21b, 21c, 21d are handled during coating processes compared with the previous design. Also, less time is required to cement the prisms 21a, 21b, 21c, 21d together.

Thus, an improved color beamsplitter cube and liquid crystal light valve projector employing the color beamsplitter cube has been disclosed. It is to be understood that the described embodiments are merely illustrative of some of the many specific embodiments which represent applications of the principles of the present invention. Clearly, numerous and other arrangements can be readily devised by those skilled in the art without departing from the scope of the invention.

What is claimed is:

1. A liquid crystal light valve projector comprising:

a light source for projecting white light along an input path;

a color beamsplitter comprising upper and lower portions, and wherein the lower portion of the color beamsplitter is disposed along the input path for receiving the white light from the light source, wherein the beamsplitter comprises:

four prisms that each comprise a base and two sides, and wherein the prisms are disposed such that the sides of the prisms are adjacent each other, and wherein the incident white light is incident upon a lower portion of the base of a selected one of the four prisms and is separated and coupled along three separate light paths through the respective lower portions of the prisms corresponding to red, green and blue light paths;

means disposed along the red light path for reflecting the red light back toward the upper portion or the beamsplitter;

means disposed along the green light path for reflecting the green light back toward the upper portion or the beamsplitter; and means disposed along the blue light path for reflecting the blue light back toward the upper portion or the beamsplitter;

and wherein the red, green and blue light returned toward the beamsplitter is combined by the upper portion of the beamsplitter to produce white light that is transmitted along an output path emanating from the upper portion of the beamsplitter as projected light.

2. The projector of claim 1 further comprising an input lens disposed along the input path for focusing the white light onto the lower portion of the beamsplitter.

3. The projector of claim 1 further comprising an output lens disposed along the output path emanating from the upper portion of the beamsplitter for projecting the white light for display.

4. The projector of claim 1 wherein the prisms comprise right angle prisms.

5. The projector of claim 1 wherein the prisms are bonded together.

6. The projector of claim 1 wherein the prisms are cemented together using optical cement.

7. The projector of claim 1 wherein the prisms further comprise optical coatings applied to each of the adjacent bonded surfaces thereof so that the incident white light is separated and coupled along the three separate light paths corresponding to the red, green and blue light paths.

8. The projector of claim 1 wherein the means for reflecting the red light back toward the upper portion or the beamsplitter comprise two mirrors.

9. The projector of claim 1 wherein the means for reflecting the green light back toward the upper portion or the beamsplitter comprise two mirrors.

10. The projector of claim 1 wherein the means for reflecting the blue light back toward the upper portion or the beamsplitter comprise two mirrors.

* * * * *